United States Patent [19]

Allen

[11] Patent Number: 4,554,018
[45] Date of Patent: Nov. 19, 1985

[54] PRODUCTION OF POLYMERIC THICKENERS AND THEIR USE IN PRINTING

[75] Inventor: Adrian S. Allen, Bradford, England
[73] Assignee: Allied Colloids Limited, England
[21] Appl. No.: 575,735
[22] Filed: Feb. 1, 1984
[51] Int. Cl.$^4$ .............................................. C09D 11/02
[52] U.S. Cl. ............................. 106/20; 260/DIG. 38; 524/457; 524/829; 524/831; 524/832; 524/833; 526/287; 526/240; 526/312
[58] Field of Search ................... 106/20; 524/457, 829, 524/831, 832, 833; 260/DIG. 38; 526/312, 287, 240

[56] References Cited

U.S. PATENT DOCUMENTS 3,657,175   4/1972   Zimmerman ........................... 524/96
4,059,552  11/1977   Zweigle et al. ...................... 524/547
4,172,066  10/1979   Zweigle et al. ...................... 524/829

FOREIGN PATENT DOCUMENTS 2007238   5/1979   United Kingdom .

Primary Examiner—Prince E. Willis
Assistant Examiner—Amelia B. Yarbrough
Attorney, Agent, or Firm—Lawrence Rosen

[57] ABSTRACT

A thickening agent that is particularly suitable for alkaline print pastes is a water insoluble, water swellable or water swollen polymer made by reverse phase polymerization of a blend of water soluble, copolymerizable monomers in which the monomers comprise at least one ethylenically unsaturated acid having free acid groups, at least one ethylenically unsaturated acid having salt groups selected from ammonium, amine and alkali metal and at least one ethylenically unsaturated cross-linking agent, the molar proportions of the said free acid groups to the said salt groups during the polymerization being from 80:20 to 10:90.

21 Claims, No Drawings

PRODUCTION OF POLYMERIC THICKENERS AND THEIR USE IN PRINTING

It is standard practice to thicken aqueous compositions by including in the water a synthetic or naturally occurring, or modified naturally occurring, polymeric material that will dissolve or swell in the water. For instance for very many years it has been well known to thicken printing pastes by dissolving into them natural or modified natural materials such as sodium alginate, guar gum, hydroxy ethyl guar derivatives and starch ethers. More recently various synthetic polymers have tended to replace the natural or modified natural polymers. Generally these synthetic polymers are supplied to the user in the form of a finely divided solid which, upon incorporation into the desired aqueous medium, swells to form a micro-gel latex that serves as a thickener for the aqueous medium. Typical powdered polymers are cross-linked polymers of acrylic acid optionally with lower alkyl vinyl ether, cross-linked copolymers of maleic anhydride with alkyl vinyl ether and cross-linked copolymers of maleic anhydride with ethylene.

Although these synthetic polymers are often preferred as thickeners, for instance because of their more consistent thickening properties and because of their greater thickening efficiency than the natural polymers, their use involves many disadvantages, especially when they are used for thickening printing pastes. They have a very low bulk density making transport difficult and costly, they cause dust problems due to their content of very fine particles and they can block or wear printing screens due to their content of larger particles, and the rheology they impart to printing pastes is sometimes unsatisfactory such that it is necessary to add other polymers to impart suitable viscoelasticity to the printing pastes.

In U.S. Pat. Nos. 4,059,552 and 4,172,066 it is proposed to thicken an aqueous medium by the use of microbeads of cross-linked water insoluble, water swellable polymer. These microbeads are made by reverse phase emulsion polymerisation of appropriate monomers including cross-linking agent followed by separation of the resultant polymer particles from the oil medium in which the polymerisation was conducted.

In British Patent Specification No. 2,007,238 it is proposed to use a blend of a water soluble polymer and a water swellable cross-linked synthetic polymer which, in the examples, is a cross-linked copolymer of acrylamide and 2-acrylamido-2-methyl propane sulphonic acid (AMPS) but which can, according to the description, be replaced by acrylic acid or methacrylic acid and which is made by reversed phase polymerisation. The use of copolymers of AMPS and acrylamide in printing pastes containing electrolyte is also described in British Patent Specification No. 2,017,159A.

It is well known that it is generally preferred for a printing paste to have a pH of around 9 and at this pH any acid groups in the polymer will be in the form of a salt. Normally the polymer is made by polymerising the acrylic acid or other unsaturated acid in the form of a salt, i.e. at a high pH. For instance in the examples of U.S. Pat. No. 4,059,552 and British Patent No. 2,007,238 each of the polymerisations conducted on an acidic monomer is conducted in the presence of sufficient sodium hydroxide to convert all the acid groups to salt form. It is also known to polymerise monomers such as acrylic acid whilst wholly in the free acid form.

We have now surprisingly found that it is possible to vary the thickening effect of such polymers containing acid groups by adjusting the proportion of acid groups to salt groups that are present during the polymerisation and, in particular, that by having certain proportions of such groups it is possible to obtain a greatly improved thickening effect compared to that obtained when the polymerisation is conducted with all the acid groups in free acid form or all the acid groups in salt form.

In the invention a water insoluble, water swellable or swollen polymer is made by reverse phase polymerisation of a blend of water soluble, copolymerisable monomers and in this process the monomers comprise (a) at least one ethylenically unsaturated acid having free acid groups, (b) at least one ethylenically unsaturated acid having salt groups selected from ammonium, amine and alkali metal salt groups, and (c) at least one ethylenically unsaturated cross-linking agent and the molar proportions of the said free acid groups to the said salt groups during the polymerisation is from 80:20 to 10:90. Although bifunctional acids can be used it is generally preferred that each of the acids (a) and (b) should be monocarboxylic or monosulphonic acids, generally monocarboxylic acids, in which event the molar proportions of the monomer in free acid form to the monomer in salt form must be 80:20 to 10:90.

Typical acids that can be used include vinyl sulphonic acid, sulphopropyl acrylate or methacrylate, itaconic acid, crotonic acid, maleic acid and fumaric acid but the preferred acids are AMPS or, especially, acrylic or methacrylic acid, acrylic acid generally being the most suitable monomer. The monomers (a) and (b) may be provided by partial neutralisation of monomer having free acid groups or may be made by blending monomer having free acid groups with a monomer, which may be the same or different as the free acid monomer, having salt groups. A blend of two or more monomers having free acid groups may be used and/or a blend of two or more monomers having salt groups may be used.

The salt groups are preferably ammonium groups but they may be of an alkali metal, generally sodium but optionally potassium or any other suitable alkali metal, or of an amine, generally an aliphatic amine. Suitable amines are primary and secondary aliphatic amines, generally primary and secondary alkylamines or alkanolamines, for instance methylamine, ethylamine, monoethanolamine or diethanolamine. The free acid form of the monomer may be converted to the salt form by adding a suitable base, such as a hydroxide, that will provide the desired ammonium, amine or alkali metal ion in conventional manner.

The ethylenically unsaturated cross-linking agent may be any material that is suitable for cross-linking acrylic monomers, and many such materials are known and include methylene bisacrylamide, allyl methacrylate, diallyl phthalate and glycol diacrylates. Methylene bisacrylamide is generally preferred.

The optimum thickening effect is obtained when the said molar ratio is between 70:30 and 20:80, most preferably between 65:35 and 30:70. When the acid for both (a) and (b) is acrylic acid the specified proportions indicate that the pH during the polymerisation should be from 3.7 to 5.5 and preferably from 4.3 to 5.2. With other acids the pH range may be different, depending upon the strength of the acid.

The blend may include water soluble, copolymerisable, ethylenically unsaturated monomers additional to the types (a), (b) and (c). Typical additional monomers include hydroxy ethyl acrylate or methacrylate, N-vinyl-N-methylacetamide and acrylamide. If additional monomer is to be included then acrylamide is generally the preferred additional monomer.

It would be expected that if the effect of acrylamide varies with the amount of acrylamide, the effect would be directly or indirectly proportional to the amount of acrylamide in the blend. We have surprisingly found that the effect is not proportional but that very low and medium amounts give a valuable improvement whilst low and high amounts are less desirable. In particular we find that the amount of acrylamide should be from 0 to 3% or from 13 to 45% with best results being achieved either with 0% or with 15 to 45% acrylamide (the percentages being mole percent in the copolymer). If acrylamide is present the preferred amount is generally from 20 to 40%, most preferably 25 to 35%. All these values are indicated on the basis of thickening efficiency. When the copolymer is being used for thickening a fabric printing paste an additional desirable property is that it should be possible to wash the thickener out of the fabric. High amounts, for instance above 40 mole percent, acrylamide make it difficult to wash the fabric thoroughly, resulting in a stiffer hand and poor drape qualities.

The amount of cross-linking agent is generally from $2 \times 10^{-3}$ to $150 \times 10^{-3}$ mole percent, preferably $10 \times 10^{-3}$ to $40 \times 10^{-3}$ mole percent based on moles of polymerisable monomers. For instance when the monomers are free acrylic acid and acrylic acid salt and the cross-linking agent is methylene bisacrylamide the amount is preferably from 42 to 3,200 ppm, most preferably 200 to 850 ppm by weight on weight of polymer.

The properties of the polymer can be varied by appropriate choice of amount of cross-linking agent and the average molecular weight of the copolymer and the molecular weight distribution of the copolymer. A meaningful way of defining the molecular weight of the copolymer is to define the intrinsic viscosity of the polymer obtained using the identical polymerisation conditions but in the absence of cross-linking agent. In the invention the intrinsic viscosity under these circumstances measured at 25° C. in 1 M sodium chloride solution buffered to pH 7.0 is preferably from 4 to 20 dl $gm^{-1}$, most preferably 8 to 10 or 14. The polymerisation should therefore be conducted using initiator concentrations and/or chain transfer agents in known manner to achieve these levels of intrinsic viscosity.

The polymerisation is conducted as a reverse phase polymerisation, for instance as is described generally in U.S. Pat. No. 4,059,552. Thus an aqueous solution of the monomer blend is dispersed in a water immiscible liquid and is polymerised to form a dispersion of polymer particles, swollen by water, in the water immiscible liquid. The water immiscible liquid may comprise mineral oil, kerosene, dibutyl phthalate or vegetable oil. It will generally include a suspending agent, preferably a polymeric suspension polymerisation stabiliser, most preferably one formed from hydrophilic and hydrophobic monomers, for instance as described in British Patent No. 1,482,515. It may also contain a water in oil emulsifier of HLB 3 to 8. The amount of emulsifier is generally very low and, if present at all, serves solely to facilitate reducing the particle size of the aqueous monomer droplets. Polymerisation is therefore preferably a reverse phase suspension polymerisation, polymerisation occurring within the monomer droplets. The aqueous monomer solution is homogenised into the water immiscible liquid to form the aqueous monomer droplets, the suspension may then be deoxygenated and polymerisation initiated in conventional manner, for instance by adding a suitable radical-producing initiator.

The product of the polymerisation is a dispersion in water immiscible liquid of aqueous polymer particles. It is often preferred that the product should be dehydrated. For instance the continuous phase may include a volatile hydrocarbon or chlorinated hydrocarbon and the product may then be subjected to azeotropic distillation to reduce the water content to below 25% by weight polymer, generally below the ambient moisture content of the polymer particles when exposed to the atmosphere.

The resultant composition is generally used for thickening an aqueous medium without prior separation of the polymer particles from the water immiscible liquid. Thus the dispersion of particles in the water immiscible liquid is added to an aqueous medium in order to produce microgel latex thickening of that medium. To facilitate emulsification of the dispersion in the aqueous medium an emulsifier, generally an oil in water emulsifier, may be added to facilitate emulsifying the oily continuous phase in water and thereby allowing the dispersed polymer particles to be wetted by water and to swell to form the microgel latex. The amount of polymer in the aqueous medium is generally from 0.05 to 5%, most preferably 0.1 to 1% by weight.

The pH of the aqueous medium should be such that substantially all the acid groups are ionised and in practice this generally means that the pH should be at least 6. The viscosity drops markedly when the pH falls below the level indicating complete ionisation, and also, at undesirably low pH values, the dispersion may gel on storage. If the pH is too high the viscosity may drop due to an electrolytic effect and generally the pH should be between 7 and 10 with best results being achieved around 8.5 to 9.5. Amine, ammonium compound or alkali metal compound may be added to the dispersion of polymer particles in water immiscible liquid in order to raise the pH of the eventual aqueous medium or such compound may be added to the aqueous medium. Generally the compounds used for this purpose is sodium hydroxide, ammonia or an amine.

The thickened aqueous medium can be used for a wide variety of purposes but most preferably serves as the aqueous medium of a printing paste that additionally comprises a pigment or dye. The invention includes not only the described method of polymerisation, the compositions resulting from this and thickened aqueous media, including print paste, containing the resultant polymer as thickening agent but also includes methods in which a substrate is printed with an aqueous print paste thickened by the described polymer and comprising a pigment or dye. The print paste may be formulated in conventional manner, except for the use of the specified polymer as the thickening agent, and thus may include conventional additives such as inorganic salts, urea, coacervating agents such as coconut diethanolamide, softening agents such as dibutyl phthalate, dioctyl phthalate and fatty glyceride esters, lubricants such as silicone oils, pigment dispersants such as low molecular weight polyacrylic acid, wetting agents such as di-ethylhexylsulphosuccinate and emulsifiers such as ethoxylated nonyl phenol and ethoxylated fatty alcohols.

Aqueous pastes for pigment printing will generally include also a synthetic binder, most preferably an alkyl (usually methyl, ethyl or butyl) acrylate binder cross-linked with, for instance, methylol acrylamide, the binder optionally also being formed from one or more hardening monomers such as styrene, acrylonitrile or methyl methacrylate. Other suitable binders include butadiene copolymers.

The colourant in the print paste may be one of a wide variety of pigments and dyes, that may be water soluble or water dispersible, for instance pigment, acid dyes, dispersed dyes and reactive dyes. For many printing pastes the salt forming cation is preferably volatile, for instance ammonia, in order that the cation evaporates during drying of the paste. However in others, for instance when the colourant is a reactive dye, the cation should be sodium in order that the dye will react with the cellulosic substrate under alkaline conditions.

The defined polymers have proved to be valuable thickening agents in a wide range of printing processes, for instance by engraved roller machines, hand or machine flat bed screen printing or rotary screen printing, on a wide range of substrates, for instance textiles, floor coverings and paper. The precise details of the paste will be formulated in known manner, according to the particular printing method and substrate being used. A surprising advantage of the described polymers is that pastes thickened by them give a very high colour yield and definition, and other desirable characteristics. A particularly striking advantage of the invention is that as a result of the increased thickening effect obtainable as a result of the blend of monomers (a) and (b) during the polymerisation the amount of thickener required to achieve any particular viscosity can be greatly reduced compared to the amount required when the polymerisation is conducted using monomer (a) alone or monomer (b) alone. For instance in order to obtain a viscosity of 250 poise it is possible by the invention, to reduce the required amount of polymer by 20 to 30% or more.

The following are examples of the invention:

EXAMPLE 1

An aqueous monomer solution was formed containing 0.4875 mole % of monomers based on weight of aqueous phase, $0.24 \times 10^{-4}$ mole % penta sodium diethylenetriamine pentacetate based on weight of aqueous phase, $26.6 \times 10^{-3}$ cross-linking agent (methylene bisacrylamide) based on moles of monomers and $8.6 \times 10^{-3}$ mole % of azobisamidinopropanehydrochloride based on moles of monomers. The monomers contained 20 mole % acrylamide and 80 mole % of one of various mixtures of acrylic acid and ammonium acrylate in molar ratios between 100:0 and 0:100.

A non-aqueous continuous phase was a mixture of 44% by weight mineral oil and 56% by weight volatile hydrocarbon fraction of boiling range 154°–168° C. containing as dispersion stabiliser a mixture of 46% by weight of a 6 to 1 molar copolymer of ceto-stearyl methacrylate to trimethyl β-methacryloxyethylammonium methosulphate and 54% by weight of sorbitan monooleate. The total concentration of dispersion stabiliser used was $1.9 \times 10^{-2}$ mole % on weight of aqueous phase based on the molecular weight per hydrophobic group in the surfactants. The weight ratio of oil phase to aqueous phase was 0.8833.

The aqueous monomer phase was mechanically homogenised into the oil phase and the resulting dispersion was then deoxygenated in a stirred polymerisation reactor and polymerisation initiated by $48.1 \times 10^{-3}$ mole % of sulphur dioxide and $0.68 \times 10^{-3}$ mole % per minute of tertiary butyl hydroperoxide based on moles of monomer.

The resultant polymerised dispersion was distilled at a pressure of 20 Torr and rendered water dispersable by adding a 7 mole ethoxylate of nonyl phenol equivalent to 5% by weight on weight of a dispersion containing 45% by weight of copolymer calculated as the free acid.

A sample of the dispersion was diluted in water containing sodium chloride and titrated potentiometrically to determine the polymer content the dispersion was then diluted as necessary with hydrocarbon oil to exactly 45.0% wt/wt polymer content.

Each of the dispersions was made up into a pigmented print paste at various concentrations by blending 4 parts by weight pigment (Imperon Blue KRR) 8 parts by weight binder latex (based on ethyl acrylate cross-linked with methylol acrylamide) sufficient 0.880 ammonia solution to give a pH in the paste of 9.0, the polymer dispersion, and sufficient water to give 100 parts by weight.

The pigment print paste viscosities were measured using a Brookfield Viscometer Type RVT at speed 10 rpm at 20° C. The results are shown in Table 1. Viscosities are given in Poise and the % polymer is quoted as a weight % in the print paste as the fully neutralised ammonium salt when present in the ammoniacal print paste.

TABLE 1

| Polymer Dispersion | Molar Ratio of acrylic acid to ammonium acrylate | Monomer Solution pH | Brookfield Viscosity | | | % Polymer required to give 250P |
|---|---|---|---|---|---|---|
| | | | 1.1% w/w polymer | 1.0% w/w polymer | 0.9% w/w polymer | |
| 1A | 100:0 | 2.20 | 75 | 45 | 24 | 1.449 |
| 1B | 80:20 | 3.70 | 295 | 220 | 155 | 1.033 |
| 1C | 70:30 | 4.20 | 325 | 250 | 190 | 1.000 |
| 1D | 60:40 | 4.50 | 445 | 325 | 223 | 0.925 |
| 1E | 50:50 | 4.70 | 435 | 325 | 230 | 0.918 |
| 1F | 40:60 | 5.00 | 425 | 310 | 214 | 0.934 |
| 1G | 30:70 | 5.20 | 395 | 305 | 226 | 0.936 |
| 1H | 20:80 | 5.30 | 365 | 275 | 183 | 0.973 |
| 1I | 15:85 | 5.35 | 355 | 255 | 164 | 0.991 |
| 1J | 10:90 | 5.45 | 350 | 255 | 160 | 0.996 |
| 1K | 5:95 | 5.75 | 215 | 160 | 117 | 1.147 |
| 1L | 0:100 | 7.15 | 185 | 140 | 106 | 1.208 |

It can be seen from these results that polymers prepared with either acrylic acid alone or ammonium acrylate alone are very much less efficient as print paste thickeners than polymers prepared with both acrylic acid and ammonium acrylate in molar ratios within the scope of the invention.

EXAMPLE 2

A variety of print pastes were prepared by blending from 1 to 8 parts pigment, 8 to 13 parts binder latex (based on ethylacrylate cross-linked with methylol acrylamide), 1 part diethylene glycol-surfactant blend (as humectant), 0.25 parts silicone oil emulsion (as softener lubricant, ) 0.5 parts of 0.880 amonia, and from 0.47 to 1.225 parts copolymer, 1E, with sufficient water to 100 parts by weight.

The components excluding the copolymer dispersion were stirred together then the copolymer dispersion 1E was introduced while stirring with a Greaves High Speed Mixer. Viscosity development was rapid and full viscosity was obtained after about 2 minutes. The viscosity of each paste was measured using a Brookfield RVT viscometer at 10 rpm. Each paste was printed on 50/50 polyester/cotton cloth with a 156T screen having a number of patterned and blotch printing areas using a Johannes Zimmer laboratory printing machine, type MDF-240 with a 9 mm bar, magnet pressure 3 and magnet speed 5. The wet prints were allowed to stand for 5 minutes before drying and curing in a hot air draught at 150° C. for 4 minutes. Print phase viscosity results are given in Table 2.

TABLE 2

| Pigment | Pigment Concn (% w/w) | Binder Concn (% w/w) | Copolymer Concn (% w/w) | Paste Viscosity (poise) |
| --- | --- | --- | --- | --- |
| Helizarin Blue RT | 1 | 8 | 0.855 | 251 |
| Helizarin Blue RT | 5 | 13 | 0.990 | 242 |
| Helizarin Black TT | 8 | 10 | 0.610 | 249 |
| Helizarin Brill. Violet BD | 4 | 10 | 0.750 | 220 |
| Helizarin Orange S3G | 4 | 12 | 0.815 | 250 |
| Acramin Red FRC | 1 | 8 | 0.945 | 240 |
| Acramin Violet FFR | 5 | 13 | 1.225 | 256 |
| Acramin Red FITR | 8 | 10 | 0.805 | 251 |
| Acramin Blue FFG | 4 | 10 | 0.750 | 163 |
| Acramin Black FBRK | 4 | 10 | 0.735 | 275 |
| Imperon Orange KG | 4 | 10 | 0.750 | 182 |
| Pollux Black FB Conc | 7 | 12 | 0.470 | 250 |

Each print was of high colour yield, of bright colour, excellent definition, zero flushing, excellent fabric coverage and a soft handle.

EXAMPLE 3

The process of example 1 was repeated except that the molar ratio of acrylic acid to ammonium acrylate was 40:60 and the mole % acrylamide was varied from 0 to 65%. A pigmented print paste was prepared from each copolymer using 4 parts Imperon Blue KRR, 8 parts of the binder of example 1, 0.5 parts of 0.880 ammonia, 85.5 parts water and 2 parts of 50% active by weight polymer dispersion (calculated as fully neutralised polymer). Each paste was printed in a similar manner to example 2, each print was visually assessed for colour yield, colour brightness, print flushing, penetration of fabric and homogenity of colour coverage and assessed for stiffness by hand. Each print was then tested for wet and dry rubbing fastness using AATCC Crockmeter Rub Fastness—SDC Grey Scale Assessment, Fastness to washing using AATCC 61-1975(IIIA) Wash Test—SDC Grey Scale Assessment and Fastness to Dry-cleaning. The results are given in Table 3.

TABLE 3

| Polymer | Mole % ACM in copolymer | Paste Viscosity (Poise) | Wt. of Paste T'ferred (gms) | Rub Fastness Wet | Rub Fastness Dry | Wash Fastness Shade Change | Dry Clean Fastness Shade Change |
| --- | --- | --- | --- | --- | --- | --- | --- |
| 2A | 0 | 318 | 85 | 3/4 | 2 | 4 | 3/4 |
| 2B | 2.96 | 290 | 84 | " | " | " | 4 |
| 2C | 5.90 | 240 | 84 | " | " | " | " |
| 2D | 11.72 | 275 | 85 | " | " | " | " |
| 2E | 17.40 | 312 | 85 | " | " | " | " |
| 2F | 28.47 | 325 | 85 | " | " | " | " |
| 2G | 53.90 | 240 | 84 | " | " | 3/4 | " |
| 2H | 64.95 | 164 | 83 | " | " | " | " |

Each print was of equivalent high colour yield, a bright blue, zero flushing, equivalent low fabric penetration and excellent fabric coverage. All gave a soft handle but copolymers 2G and 2H were slightly stiffer than the rest. All the prints had good rub fastness, fastness to washing and fastness to dry cleaning but copolymers 2G and 2H gave slightly inferior wash fastness and copolymer 2A gave slightly inferior dry-cleaning fastness. Copolymers containing 0 to 60 mol % acrylamide gave a useful print paste viscosity but pastes prepared from copolymers containing no acrylamide or from 20 to 40 mole % acrylamide were of higher viscosity.

EXAMPLE 4

A monomer blend of 10 mole % acrylic acid, 90 mole % ammonium acrylate and zero % acrylamide, was polymerised by the same general technique as in Example 1 except that the resulting polymer dispersion was not distilled, and ammonia was added to the aqueous dispersion in an amount sufficient to neutralise all the acrylic acid groups and to give a dispersion containing 26% by weight ammonium polyacrylate. A pigmented print paste was prepared as in example 1 using 4 parts Imperon Blue KRR, 8 parts binder latex, 3.85 parts of polymer dispersion and 84.15 parts water.

The paste was of pH 8.2 and had a Brookfield Viscosity at 10 rpm of 240 Poise. The paste was printed onto 50/50 polyester/cotton cloth as in example 3 and the print was a bright blue of excellent definition and colour yield and was found to have good rub fastness and wash fastness.

EXAMPLE 5

A print paste was formed of 2 parts by weight of a Nylomine acid dye, 3 parts urea, 0.5 parts ammonia, water to 100 parts and sufficient polymer dispersion 1 G to give a viscosity of 5,000 cps measured on a Brookfield Viscometer at 20 rpm spindle 4 20° C. (between 1.03 and 1.85 parts by weight). The pastes were printed onto Nylon 66 double Jersey, fixed by steaming, rinsed and dried in conventional manner. This was repeated with several different acid dyes.

In all cases prints with a very high colour yield, bright colours, even fabric coverage and soft handle were produced. Fastness to washing was excellent and no staining was observed in the wet or dry rub fastness test.

Satisfactory results were also achieved when acid dye was used to formulate a paste, in similar manner, having a viscosity of 230 Poise measured on a Brookfield Viscometer at 20 rpm Spindle 6 at 20° C., this paste then being screen printed onto nylon 66 flocked rubber backed floor covering.

EXAMPLE 6

A blend of 25 mole % acrylic acid and 75 mole % ammonium acrylate was polymerised by the same general technique as in Example 1 except that the dispersion stabiliser mixture was formed of 75% by weight of a 2:1 molar copolymer of ceto stearyl methacrylate to methacrylic acid and 25% by weight sorbitan monooleate and the aqueous phase contained 0.4722 mole % of monomers based on weight of aqueous phase, $0.795 \times 10^{-4}$ mole % of penta sodium diethylenetriamine pentaacetate based on weight of aqueous phase, $5.13 \times 10^{-2}$ mole % of mono-sodium phosphate dihydrate based on weight of aqueous phase, $21.76 \times 10^{-3}$ mole % of cross-linking agent (methylene-bisacrylamide) based on moles of monomers and $9.2 \times 10^{-3}$ mole % of azobisamidinopropane hydrochloride based on moles of monomers. The dispersion obtained upon polymerisation and distillation was rendered water dispersible by adding 7.3% by weight on weight of final oil phase a phosphoric acid ester of a 5 mole ethoxylate of tridecanol and 7.3% by weight on weight of final oil phase of a 7 mole ethoxylate of nonyl phenol.

A stock thickening was prepared by blending 97% by weight water, 0.5% by weight 0.880 ammonia and 2.5% by weight of the resultant polymer dispersion (1.25% polymer solids). This clear stock thickening had a Brookfield Viscosity of 240 Poise measured at 10 rpm with spindle 6 at 20° C. 1% by weight of a disperse dye-stuff including a low concentration of electrolyte (Seriprint Red RLS) was blended into the stock to form a paste having a Brookfield Viscosity of 214 Poise at 10 rpm spindle 6 20° C. Upon printing on polyester poplin in conventional manner excellent colour yield and definition with minimal fabric penetration was obtained.

EXAMPLE 7

A blend of 21.8 mole % acrylic acid and 78.2 mole % sodium acrylate was polymerised broadly as in example 1 but using the stabilising mixture described in example 6 and the dispersing surfactants were as in example 6.

After polymerisation, the aqueous polymer gel dispersion was cooled to 50° C. and enough of a 46% wt/wt aqueous solution of sodium hydroxide was added with stirring to neutralise the carboxylic acid groups of the copolymer. The neutralised dispersion was then distilled, cooled and then they were stirred in 6.3% by weight on weight of final oil phase of a phosphoric acid ester of a 5 mole ethoxylate of tridecanol and 6.3% by weight on weight of final oil phase of a 7 mole ethoxylate of nonyl phenol. The resultant dispersion contained 55.4% by weight polysodium acrylate.

A reactive dye printing paste having a Brookfield Viscosity of 5,000 cP at 20 rpm spindle 4, 20° C. was prepared by blending 10 parts by weight urea, 2 parts sodium bicarbonate, 0.5 parts sodium metanitrobenzene sulphonate, 3 parts procion red P3BN, 4.7 parts of the polymer dispersion and water to make 100 parts.

This print paste was used to print 100% cotton fabric by screen printing in conventional manner. The printed product had excellent colour yield, print definition and soft hand.

I claim:

1. A process in which a water insoluble, water swellable or swollen polymer is made by reverse phase polymerisation of a water soluble blend of copolymerisable monomers and in which the monomers comprise (a) at least one ethylenically unsaturated acid having free acid groups, (b) at least one ethylenically unsaturated acid having salt groups selected from ammonium, amine and alkali metal salts, (c) at least one ethylenically unsaturated cross-linking agent, and in which the molar proportions of the said free acid groups to the said salt groups during the polymerisation are 80:20 to 10:90.

2. A process according to claim 1 in which each of the acids (a) and (b) are selected from ethylenically unsaturated monocarboxylic and ethylenically unsaturated sulphonic acids.

3. A process according to claim 1 in which each of the acids (a) and (b) are selected from acrylic, methacrylic and 2-acrylamido-2-methyl propane sulphonic acid.

4. A process according to claim 1 in which the blend of monomers (a) and (b) was obtained by partially neutralising at least one ethylenically unsaturated free acid with an alkali metal compound, an amine compound or an ammonium compound.

5. A process according to claim 1 in which the monomers comprise up to 60 mole %, based on the total monomers, of at least one ethylenically unsaturated copolymerisable water soluble monomer that does not contain acid groups in the form of free acid groups or salt groups.

6. A process according to claim 1 in which the monomers consist essentially of (a) a free acid selected from acrylic acid and methacrylic acid, (b) an acid selected from acrylic acid and methacrylic acid and in the form of a salt selected from ammonium, amine and alkali metal salts wherein the molar ratio of free acid: salt is from 80:20 to 10:90, (c) 0 to 3% or 15 to 40% acrylamide, and (d) at least one ethylenically unsaturated cross-linking agent.

7. A process according to claim 1 in which the said molar proportions are from 65:35 to 30:70.

8. A process according to claim 1 in which the amount of ethylenically unsaturated cross-linking agent is from $2 \times 10^{-3}$ mole % to $150 \times 10^{-3}$ mole % and the intrinsic viscosity of the polymer, in the absence of the cross-linking agent, is from 4 to 20 dl gm$^{-1}$ measured at 25° C. in 1M sodium chloride aqueous solution buffered at pH 7.

9. A process according to claim 1 in which the reverse phase polymerisation process results in the production of a dispersion in oil of aqueous polymer particles and the dispersion is then dehydrated by azeotropic distillation to reduce the water content of the particles to below 25% by weight of polymer.

10. A process according to claim 1 in which the dry size of the particles made by the polymerisation is from 0.1 to 10 μm.

11. A process according to claim 1 in which the reverse phase polymerisation is a reverse phase suspension polymerisation process conducted in the presence of a polymeric suspension polymerisation stabiliser.

12. A composition comprising water insoluble, water swellable or water swollen polymer particles made by a process according to claim 1.

13. A composition according to claim 12 in the form of a dispersion of the particles in water immiscible liquid in which the reverse phase polymerisation was conducted.

14. A composition according to claim 12 comprising a dispersion of the particles in a water immiscible liquid in which the polymerisation was conducted and which contains a surfactant for assisting dispersion of the water immiscible liquid into water.

15. A composition according to claim 12 in which the polymer particles contain less than 20% by weight water, based on the polymer and are water swellable.

16. A composition according to claim 12 in which the polymer particles are swollen by water and the composition includes ammonia, amine or alkali metal compound that has been added after the polymerisation.

17. An aqueous composition thickened by the presence therein of water insoluble, water swollen particles that have been made by a process according to claim 1 and in which the composition has a pH such that substantially all the acid groups in the polymer are ionised.

18. A composition according to claim 17 having a pH of from 8.5 to 9.5.

19. A composition according to claim 17 in the form of a print paste additionally comprising a pigment or dye.

20. A method in which a substrate is printed with an aqueous print paste comprising a pigment or dye and which has been thickened by the presence therein of water insoluble, water swollen particles that have been made by a process according to claim 1.

21. A process in which a water insoluble, water swellable or swollen polymer is made by reverse phase polymerisation of a water soluble blend of copolymerisable monomers and in which the monomers comprise (a) acrylic acid having free acid groups, (b) acrylic acid having ammonium or alkali metal salt groups, (c) at least one ethylenically unsaturated cross-linking agent, and in which the molar proportions of the said free acid groups to the said salt groups during the polymerisation are 80:20 to 10:90.

* * * * *